United States Patent [19]

Ostrozynski et al.

[11] 4,157,976

[45] Jun. 12, 1979

[54] CONSTANT BOILING MIXTURES OF 1,1,1,2-TETRAFLUOROCHLOROETHANE AND CHLOROFLUOROMETHANE

[75] Inventors: Robert L. Ostrozynski, Williamsville; Sabatino R. Orfeo, Orchard Park, both of N.Y.; Philip E. Jones, Basking Ridge, N.J.; Earl A. E. Lund, West Seneca, N.Y.

[73] Assignee: Allied Chemical Corporation, Morris Township, Morris County, N.J.

[21] Appl. No.: 864,365

[22] Filed: Dec. 27, 1977

[51] Int. Cl.$^2$ .............................................. C09K 5/04
[52] U.S. Cl. ........................................ 252/67; 252/66; 252/78.1; 252/305; 252/364; 252/DIG. 9
[58] Field of Search .................. 252/67, 66, 78.1, 305, 252/364, DIG. 9

[56] References Cited

U.S. PATENT DOCUMENTS 2,920,112  1/1960  Larsen ................................. 260/653
2,951,102  8/1960  Larsen et al. ........................ 260/653

OTHER PUBLICATIONS

"Oscillographic Study of a Direct-Flow Compressor Operating on Azeotropic Mixtures of Refrigerants", Vodyanitskaya et al., Kholod. Tekh. Tekhnol, 1969, No. 8, 6–9; CA 72:14193p.

"Properties and Use of Mixtures of Agents in Compression Refrigerating Machines", Chaikovskn et al., Kholod, Tekh. Tekhnol, 1972, No. 15, 56–61; CA 79:33043a.

*Primary Examiner*—Harris A. Pitlick
*Attorney, Agent, or Firm*—Jay P. Friedenson

[57] ABSTRACT

Constant boiling mixtures of 1,1,1,2-tetrafluorochloroethane and chlorofluoromethane are useful as refrigerants, heat transfer media, gaseous dielectrics, expansion agents, aerosol propellants, working fluids in a power cycle and solvents, and are potentially environmentally safe.

3 Claims, No Drawings

CONSTANT BOILING MIXTURES OF 1,1,1,2-TETRAFLUOROCHLOROETHANE AND CHLOROFLUOROMETHANE

BACKGROUND OF THE INVENTION

This invention relates to mixtures of fluorinated hydrocarbons and more particularly to constant boiling fluorocarbon mixtures which comprise 1,1,1,2-tetrafluorochloroethane and chlorofluoromethane. Such mixtures are useful as refrigerants, heat transfer media, gaseous dielectrics, expansion agents, aerosol propellants, working fluids in a power cycle and solvents, and are potentially environmentally safe substitutes for trichlorofluoromethane and dichlorodifluoromethane which are industry standards for refrigerant and aerosol propellant applications.

Recently the long term environmental effects of trichlorofluoromethane and dichlorofluoromethane have come under substantial scientific scrutiny. It has been postulated that these materials break down in the stratosphere under the influence of ultraviolet light to release chlorine atoms which are theorized to undergo chemical reactions in the stratosphere which may lead to depletion of the stratospheric ozone layer which shields the earth from harmful ultraviolet radiation. A substantial reduction in this ozone layer could have a serious impact on the quality of life on earth.

There is a continuing need in this art for new materials having new combinations of properties for use in the various applications mentioned above. In view of the potential environmental problem discussed above, there is a particular need for new materials possessing properties which make them useful in the subject applications, which materials are potentially environmentally safe.

There is a limit to the number of single fluorinated hydrocarbon substances which would be candidates for such environmentally safe materials. Mixtures of known materials, however, might be used if the desired combination of properties can be found in a given mixture. Simple mixtures, however, create problems in design and operation of refrigeration and other equipment because of segregation of the components in the liquid and vapor phases. To avoid such segregation problems it is particularly desirable to discover new azeotropic or constant boiling blends of fluorocarbons. Such blends would not suffer from such segregation problems. Unfortunately, however, azeotropism is an unpredictable phenomenon thus complicating the search for novel azeotropic compositions which possess desirable combinations of properties.

An object of the present invention is to provide a new azeotropic or constant boiling composition of matter comprising fluorocarbon components.

Another object of the invention is to provide new, low boiling azeotropic or constant boiling mixtures which have properties which make them particularly useful as refrigerants and aerosols.

Still another object of the invention is to provide new, low boiling, azeotropic or constant boiling mixtures, useful in producing refrigeration or as expansion agents which are potentially environmentally safe.

Other objects of the invention will become apparent from the following description.

DESCRIPTION OF THE INVENTION

In accordance with the present invention, azeotropic or constant boiling mixtures have been discovered which consist essentially of about 71.9 weight percent of 1,1,1,2-tetrafluorochloroethane and about 28.1 weight percent of chlorofluoromethane at 20.0° C.

For the purpose of this discussion, by azeotropic or constant boiling is intended to mean also essentially azeotropic or essentially constant boiling. In other words, included within the meaning of these terms are not only the true azeotrope described above at 20.0° C. but also other compositions containing the same components in different proportions which are true azeotropes at other temperatures and pressures, as well as those equivalent compositions which are part of the same azeotropic system and are azeotrope-like in their properties. As is well recognized in this art, there is a range of compositions containing the same components as the azeotrope which not only will exhibit essentially equivalent properties for refrigeration and other applications, but which will exhibit essentially equivalent properties to the true azeotropic compositions in terms of constant boiling characteristics or tendency not to segregate or fractionate upon boiling.

The novel azeotropic composition of the invention has a boiling point of $-13.29°$ C./760 mm Hg. 1,1,1,2-Tetrafluorochloroethane has a boiling point of about $-12.00°$ C./760 mm. Chlorofluoromethane has a boiling point of $-9.22°$ C./760 mm Hg. It can be seen that the boiling point of the azeotrope is lower than that of either of its components thereby affording higher refrigerating capacities than either of its components and, conversely, affording higher vapor pressures than either of its components.

The novel azeotropic mixtures are considered to be potentially environmentally safe because it is believed that these mixtures will substantially break down in the troposphere and thus not reach the stratosphere where their decomposition could adversely affect the ozone layer.

The novel azeotropic mixtures may be used to produce refrigeration by condensing the mixtures and thereafter evaporating same in the vicinity of a body to be cooled.

The use of the azeotropic mixtures eliminate the problem of segregation and handling in the operation of the systems because of the behavior of azeotropic mixtures essentially as a single substance. The novel azeotropic mixtures also offer the advantage of being substantially non-flammable.

The preferred composition according to the invention is the true azeotrope which consists essentially of about 71.9 weight percent of 1,1,1,2-tetrafluorochloroethane and about 28.1 weight percent of chlorofluoromethane at 20° C. A preferred range of equivalent compositions in azeotropic characteristics are those which contain from about 38.5–99.5 weight percent of 1,1,1,2-tetrafluorochloroethane and about 0.5 to 61.5 weight percent of chlorofluoromethane at 20° C. and, still preferably, from about 58.0–86.0 weight percent of 1,1,1,2-tetrafluorochloroethane and about 14.0–42.0 weight percent of chlorofluoromethane at 20° C.

EXAMPLE 1

A phase study was made on 1,1,1,2-tetrafluorochloroethane (b.p. $-12.00°$ C./760 mm) and chlorofluoromethane (b.p. $-9.22°$ C./760 mm) wherein the composition was varied and the vapor pressures were measured at a constant temperature of 20.0° C. An azeotropic composition at 20° C. was obtained as evidenced by the maximum pressure observed and was identified as follows:

1,1,1,2-tetrafluorochloroethane 71.9 weight percent
chlorofluoromethane 28.1 weight percent The boiling point of this azeotrope at 760 mm. was determined to −13.29° C.

EXAMPLE 2

An evaluation of the refrigeration properties of the azeotropic mixtures of the invention and its components are shown in the following Table. The data are generated on a one ton basis, that is to say the removal of heat from a space at the rate of 12,000 BTU/hr.

Table

Comparison of Refrigeration Performance

|  | Dichlorodifluoromethane | 1,1,1,2-Tetrafluorochloroethane | Chlorofluoromethane | Azeotropic Composition 71.9 weight percent of 1,1,1,2-tetrafluorochloroethane and 28.1 weight percent of chlorofluoromethane |
| --- | --- | --- | --- | --- |
| Evaporator Temperature (°F.) | 40 | 40 | 40 | 40 |
| Evaporator Pressure (psia) | 51.67 | 28.00 | 25.24 | 29.00 |
| Condenser Temperature (°F.) | 110 | 110 | 110 | 110 |
| Condenser Pressure (psia) | 151.0 | 94.48 | 84.4 | 99.5 |
| Coefficient of Performance | 5.86 | 5.84 | 6.26 | 6.08 |
| Net Refrigeration Effect (BTU/lb) | 47.91 | 49.19 | 121.69 | 69.64 |
| Displacement (ft$^3$/min/ton) | 3.23 | 5.34 | 4.89 | 4.74 |

By net refrigeration effect is intended to mean the change in enthalpy of the refrigerant in the evaporator or, in other words, the heat removed by the refrigerant in the evaporator.

By coefficient of performance (COP) is intended to mean the ratio of the net refrigeration effect to the compressor work. It is a measure of the efficiency of the refrigerant.

For a refrigeration cycle typified by the above conditions the COP of the azeotrope represents an increase of about 1.0% over the COP values anticipated if both components of the azeotrope behaved as a non-azeotropic physical blend rather than as an azeotrope. Moreover, the COP value of the azeotrope shows a 3.9% increase in refrigeration efficiency over dichlorodifluoromethane.

Additives such as lubricants, corrosion inhibitors, stabilizers and others may be added to novel compositions of the invention for a variety of purposes provided that they do not have an adverse influence on the compositions for their intended applications.

In addition to refrigerant application, the novel constant boiling compositions of the invention are also useful as heat transfer media, gaseous dielectrics, expansion agents such as for polyolefins and polyurethanes, working fluids in power cycles and as solvents.

We claim:

1. Constant boiling mixtures consisting essentially of about 38.5–99.5 weight percent of 1,1,1,2-tetrafluorochloroethane and about 0.5–61.5 weight percent of chlorofluoromethane.

2. Constant boiling mixtures according to claim 1 consisting essentially of about 58.0–86.0 weight percent of 1,1,1,2-tetrafluorochloroethane and about 14.0–42.0 weight percent chlorofluoromethane.

3. The process of producing refrigeration which comprises condensing a constant boiling mixture as described in claim 1 and thereafter evaporating said mixture in the vicinity of a body to be cooled.

* * * * *